United States Patent Office 2,963,480
Patented Dec. 6, 1960

2,963,480
6-PTERIDINEHYDRAZINE AND AMIDRAZONE DERIVATIVES

Edward C. Taylor, Princeton, N.J., and Joseph Weinstock, Phoenixville, Pa. (both of 1500 Spring Garden St., Philadelphia 1, Pa.)

No Drawing. Filed Dec. 29, 1959, Ser. No. 862,455

9 Claims. (Cl. 260—251.5)

This invention relates to new 6-pteridinehydrazide and amidrazone derivatives having useful diuretic and natriuretic activity.

The novel pteridine derivatives of this invention are represented in greater detail by the following fundamental formula:

FORMULA I

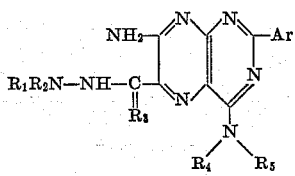

when:

$R_1$ and $R_2$ represent hydrogen or lower alkyl having a maximum of 4 carbon atoms but preferably methyl;
$R_3$ represents O or NH;
$R_4$ and $R_5$ represent hydrogen or lower alkyl having a maximum of 4 carbon atoms but preferably methyl;
Ar represents phenyl, chlorophenyl, tolyl, methoxyphenyl, α,α,α-trifluorotolyl, hydroxylphenyl, aminophenyl, thienyl or pyridyl.

Advantageous compounds of this invention are represented by the following formula:

FORMULA II

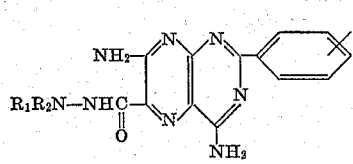

when:

$R_1$ and $R_2$ are hydrogen or methyl and;
$R_6$ is hydrogen, chloro, methyl, methoxy, hydroxy, amino, or trifluoromethyl.

A compound which is particularly advantageous and preferred is 4,7-diamino-2-phenyl-6-pteridinecarboxylic acid methylhydrazide.

The pteridinehydrazides and amidrazones of this invention are prepared from the corresponding carboxylic esters and cyanides respectively which are described fully in copending applications by reaction with hydrazine or an alkyl substituted hydrazine. When the monoalkylhydrazines such as methylhydrazine are used in the reaction as one skilled in the art will recognize the methyl group in the final product can be substituted on the nitrogen adjacent to the carbonyl carbon at the 6-position or on the terminal nitrogen. Both of these isomers have diuretic activity and are included in this invention. Actually it has been found that a mixture of the two isomers is formed. For purposes of convenience these compounds are represented as the terminally substituted compounds.

The preferred hydrazide derivatives are prepared by reacting a 6-pteridinecarboxylic ester preferably the methyl or ethyl ester with a hydrazine in an hydroxylated polar organic solvent having less than 6 carbon atoms such as ethoxyethanol, methoxyethanol, ethylene glycol or propylene glycol at elevated temperatures such as from about 70–200°, preferably about 90–150° C. for from about 10 minutes to 8 hours. The resulting acid hydrazides often separate upon cooling and are isolated by filtration. The carboxylic ester starting material is prepared by reacting a 4,6-diamino-2-aryl-5-nitrosopyrimidine with a cyanoacetic acid ester as described more fully in a copending application and hereafter in the examples.

The amidrazone derivatives are prepared by reacting a 6-cyanopteridine derivative with a hydrazine in a lower alcohol such as methanol or ethanol usually at reflux. Dilution with water separates the desired amidrazone derivative. The 6-cyanopteridine starting material is prepared by condensing a 4,6-diamino-2-aryl-5-nitrosopyrimidine with malononitrile by heating in a liquid tertiary amine such as pyridine at temperatures above 50° C. for from about 1–12 hours as described more fully in a copending application and hereafter in the examples.

The pharmaceutically acceptable acid addition salts of the hydrazides and amidrazones of this invention formed with nontoxic acids such as hydrochloric, sulfuric, carbonic, maleic, methylsulfonic, citric, phosphoric, etc. acid can be used alternatively with the parent compounds. These salts can be prepared in many ways but most advantageously are prepared by reacting the bases with the desired acid in a lower alcohol then evaporating the alcohol solvent to leave the salt. Alternatively the salt formation is carried out in an aqueous slurry or solution.

The following examples are not limiting but are illustrative of compounds of this invention and will make the preparation of these compounds fully apparent to one skilled in the art.

Example 1

To a boiling solution of 6.45 g. of 4,6-diamino-2-phenyl-5-nitrosopyrimidine in 400 ml. of methanol is added 2.94 ml. of methyl cyanoacetate and then 1.78 g. of sodium methoxide. The resulting mixture is refluxed for one hour. Yellow crystals are collected by filtration of the hot mixture and extracted with 300 ml. of boiling water. Recrystallization from dimethylformamide yields yellow crystals of methyl 4,7-diamino-2-phenyl-6-pteridinecarboxylate, M.P. about 286° C.

Methylhydrazine (5.0 g.) is added to a refluxing solution of 3.0 g. of methyl 4,7-diamino-2-phenyl-6-pteridinecarboxylate in 300 ml. of 2-ethoxyethanol. The resulting mixture is refluxed for 10 minutes. Cooling, then filtering and recrystallizing the precipitate from aqueous dimethylformamide gives a mixture of 4,7-diamino-2-phenyl-6-pteridinecarboxylic acid 2-methylhydrazide and the corresponding 1-methylhydrazide.

A solution of the methylhydrazide (500 mg.) is reacted with one equivalent of maleic acid in ethanol on the steam bath. Evaporation gives the maleate salt.

Example 2

A mixture of 2.0 g. of methyl 4,7-diamino-2-phenyl-6-pteridinecarboxylate, made as in Example 1, in 200 ml. of ethylene glycol is treated with 4.5 g. of hydrazine. The resulting mixture is heated at 150–160° C. for 30 minutes. Cooling, diluting with water, filtering off the solid and recrystallizing from aqueous dimethylformamide gives 4,7-diamino-2-phenyl-6-pteridinecarboxylic acid hydrazide.

The hydrazine (1 g.) in ethanol is reacted with hydrochloric acid. Evaporation and trituration with ether gives the hydrochloride salt.

Example 3

To a stirred solution of 9.55 g. of p-chlorobenzamidine hydrochloride in 200 ml. of methanol is added, slowly, 11.1 g. of the silver salt of isonitrosomalononitrile. The resulting mixture is stirred for one hour and filtered. The filtrate is evaporated to dryness at 30–35° C. To the residue is added 150 ml. of a solution of 5-ethyl-2-methylpyridine and 2-picoline (2:1). The resulting solution is refluxed for 20 minutes. Addition of water and ethanol precipitates a dark green solid which is isolated by filtration and washed with ethanol to give 4,6-diamino-2-(p-chlorophenyl)-5-nitrosopyrimidine.

A refluxing solution of 7.8 g. of the above prepared pyrimidine in 500 ml. of methanol is treated with 2.8 g. of methyl cyanoacetate and 1.78 g. of sodium methoxide, then refluxed for one hour. Working up as in Example 1 yields methyl 4,7-diamino-2-(p-chlorophenyl)-6-pteridinecarboxylate.

Methylhydrazine (4 g.) is added to a refluxing solution of 2 g. of the carboxylate in 250 ml. of 2-ethoxyethanol. After a reflux period of 2 hour, cooling separates 4,7 - diamino - 2 - (p - chlorophenyl) - 6 - pteridinecarboxylic acid methylhydrazide.

Example 4

A solution of 4.65 g. of p-anisamidine hydrochloride in 50 ml. of methanol is treated with 5.55 g. of the silver salt of isonitrosomalononitrile and the resulting mixture is stirred for one hour. The mixture is filtered and the filtrate concentrated to dryness in vacuo at 30–40° C. The residual solid is boiled for five minutes in 30 ml. of 5-ethyl-2-methylpyridine. The solution is cooled, diluted with ethanol and filtered. The dark green solid obtained is 4,6-diamino-2-(p-methoxyphenyl)-5-nitrosopyrimidine, M.P. 278° C. (dec.).

Treatment of a methanol solution of the above prepared pyrimidine with methyl cyanoacetate and sodium methoxide gives methyl 4,7 - diamino - 2 - (p - methoxyphenyl)-6-pteridinecarboxylate.

A mixture of 2 g. of the ester, 2 g. of hydrazine and 200 ml. of methoxyethanol is heated at reflux for 4 hours. The desired 4,7-diamino-2-(p-methoxyphenyl)-6-pteridinecarboxylic acid hydrazide separates upon cooling.

Example 5

Dry hydrogen chloride is passed into a cooled solution of 54.5 g. of 3-thiophenecarbonitrile in 75 ml. of absolute ethanol and the resulting solution is allowed to stand for 48 hours. To the solid is added portionwise an 8% solution of dry ammonia in absolute ethanol containing 12 g. of ammonia. The reaction mixture is shaken for 24 hours, allowed to stand for 48 hours and filtered. The filtrate is allowed to evaporate to dryness in the open air. The residue is dissolved in water. The aqueous solution is acidified with concentrated hydrochloric acid, treated with charcoal, filtered and concentrated. The crystals which form are isolated by filtration to give 3-thiophenecarboxamidine hydrochloride.

To a solution of 8.1 g. of 3-thiophenecarboxamidine hydrochloride in 80 ml. of methyl alcohol is added 11.1 g. of the silver salt of isonitrosomalononitrile. The resulting mixture is stirred for 30 minutes and filtered. The filtrate is evaporated to dryness in vacuo. The residue is refluxed with 50 ml. of 5-ethyl-2-methylpyridine for twenty minutes. The mixture is cooled, diluted with 100 ml. of ethanol and filtered to give 4,6-diamino-5-nitroso-2-(3'-thienyl)-pyrimidine.

To a refluxing solution of 4.4 g. of 4,6-diamino-5-nitro-2-(3'-thienyl)-pyrimidine in 300 ml. of methanol is added 1.9 g. of methyl cyanoacetate and 1.2 g. of sodium methoxide. The resulting solution is refluxed for one hour. The hot solution is filtered. The solid material is extracted with hot water and recrystallized from dimethylformamide to give methyl 4,7-diamino-2-(3'-thienyl)-6-pteridinecarboxylate.

A mixture of 1 g. of the carboxylate, 2.0 g. of unsymmetrical dibutylhydrazine and 150 ml. of ethoxyethanol is heated at reflux for 3 hours. Cooling separated the desired 4,7-diamino-2-(3'-thienyl)-6-pteridinecarboxylic acid dibutylhydrazide.

Example 6

Treatment of 54.5 g. of 2-thiophenecarbonitrile in ethanol solution with dry hydrogen chloride and subsequently with an ethanolic solution of ammonia and working up as in Example 5 yields 2-thiophenecarboxamidine hydrochloride.

The above prepared hydrochloride (4.0 g.) is reacted with 5.6 g. of the silver salt of isonitrosomalononitrile in methanol solution and cyclized by subsequent refluxing with 35 ml. of 5-ethyl-2-methylpyridine as in Example 5 to give 4,6-diamino-5-nitroso-2-(2'-thienyl)-pyrimidine.

This pyrimidine (4.4 g.) in 350 ml. of refluxing n-propanol is treated with 2.5 g. of n-propyl cyanoacetate (prepared by refluxing cyanoacetic acid with n-propanol and concentrated sulfuric acid) and 1.2 g. of sodium methoxide. The mixture is refluxed for one hour. Crystals are filtered from the hot solution, extracted with hot water and recrystallized from dimethylformamide to give n-propyl 4,7-diamino-2-(2'-thienyl)-6-pteridinecarboxylate.

A mixture of 500 mg. of the carboxylate, 1 g. of propylhydrazine and 50 ml. of ethoxyethanol is heated at reflux for 1 hour. Cooling gives the desired 4,7-diamino-2-(2'-thienyl)-6-pteridinecarboxylic acid propylhydrazide.

Example 7

To a solution of 8.5 g. of m-toluamidine hydrochloride in 80 ml. of methanol is added 11.1 g. of the silver salt of isonitrosomalononitrile. The mixture is stirred for one hour, filtered and the filtrate concentrated to dryness in vacuo. The residue is refluxed with a mixture of 100 ml. of 5-ethyl-2-methylpyridine and 50 ml. of 2-picoline and worked up as described above to give 4,6-diamino-5-nitroso-2-(m-tolyl)-pyrimidine.

Sodium methoxide (1.78 g.) is added to a refluxing solution of 6.87 g. of 4,6-diamino-5-nitroso-2-(m-tolyl)-pyrimidine and 2.8 g. of methyl cyanoacetate in 400 ml. of methanol. The resulting mixture is refluxed for 45 minutes. Crystals are collected by filtering the hot mixture. Washing with hot water and recrystallizing from dimethylformamide gives methyl 4,7-diamino-2-(m-tolyl)-6 pteridinecarboxylate.

A mixture of 3 g. of the ester, 4 g. of hydrazine and 400 ml. of methoxymethanol is heated at reflux for 2 hours then cooled to give 4,7-diamino-2-(m-tolyl)-6-pteridinecarboxylic acid hydrazide.

The hydrazide (500 mg.) in methanol is reacted with a stoichiometric amount of phosphoric acid to give the phosphate salt.

Example 8

To a stirred solution of 5.0 g. of o-fluorobenzamidine hydrochloride in 75 ml. of ethanol is added portionwise 5.55 g. of the silver salt of isonitrosomalononitrile. The resulting mixture is stirred for one hour and filtered. The filtrate is evaporated to dryness and the residue is refluxed for ten minutes in 50 ml. of 5-ethyl-3-methylpyridine, cooled and treated with 50 ml. of ethanol. Collection of the solid material by filtration gives 4,6-diamino-2-(o-fluorophenyl)-5-nitrosopyrimidine.

Adding 2.2 g. of ethyl cyanoacetate, then 1.5 g. of sodium ethoxide to a refluxing solution of 5.2 g. of the 2-(o-fluorophenyl)-5-nitrosopyrimidine in 300 ml. of ethanol, refluxing the resulting mixture for one hour and working up as described above yields ethyl 4,7-diamino-2-(o-fluorophenyl)-6-pteridinecarboxylate which (1 g.) is reacted with 1 g. of methylhydrazine in ethoxyethanol at reflux to give 4,7-diamino-2-(o-fluorophenyl)-6-pteridinecarboxylic acid methylhydrazide.

Example 9

To a solution of 8.5 g. of m-aminobenzamidine hydrochloride in 150 ml. of methanol is added slowly 11.1 g. of the silver salt of isonitrosomalononitrile. The resulting mixture is stirred for one hour and filtered. The filtrate is evaporated in vacuo at 30–35° C. The residue is refluxed with a solution of 5-ethyl-2-methylpyrimidine (100 ml.) and 2-picoline (50 ml.) for 20 minutes. The mixture is cooled and diluted with water and ethanol. The precipitate is isolated by filtration and washed with ethanol to give a dark green solid, 4,6-diamino-2-(m-aminophenyl)-5-nitrosopyrimidine.

Treatment of this pyrimidine in methanol solution with methyl cyanoacetate and sodium methoxide and working up as in Example 1 gives methyl 4,7-diamino-2-(m-aminophenyl)-6-pteridinecarboxylate which (2 g.) is reacted with 3 g. of hydrazine in methoxyethanol to give the acid hydrazide.

Example 10

Treatment of 22.0 g. of $\alpha,\alpha,\alpha$-trifluoro-p-tolunitrile in ethanol solution with dry hydrogen chloride and then with ethanolic ammonia and working up as described above gives $\alpha,\alpha,\alpha$-trifluorotoluamidine hydrochloride.

This hydrochloride is reacted with the silver salt of isonitrosomalononitrile in methanol solution and cyclized by refluxing with 5-ethyl-2-methylpyridine as described to give 4,6-diamino-5-nitroso-2-($\alpha,\alpha,\alpha$-trifluoro-p-tolyl)-pyrimidine.

To a refluxing solution of 5.6 g. of the above prepared pyrimidine in 250 ml. of methanol is added 1.8 g. of methyl cyanoacetate and 1.2 g. of sodium methoxide. The resulting mixture is heated at reflux for one hour. The hot mixture is filtered and the crystals obtained are washed with hot water and recrystallized from dimethylformamide to give methyl 4,7-diamino-2-($\alpha,\alpha,\alpha$-trifluoro-p-tolyl)-6-pteridinecarboxylate which (2 g.) is treated at reflux with 1 g. of methyl hydrazine in ethoxyethanol for 1 hour to give 4,7-diamino-2-($\alpha,\alpha,\alpha$-trifluoro-p-tolyl)-6-pteridinecarboxylic acid methylhydrazide. A solution of 500 mg. of the hydrazide and an equivalent of maleic acid in ethanol is evaporated on the steam bath to give the maleate salt.

Example 11

To a mixture of 20 g. of 6-amino-2-phenyl-4-pyrimidol and 10 ml. of dimethylaniline is added 100 ml. of phosphorus oxychloride. The resulting mixture is refluxed for eight hours, then concentrated in vacuo. The residue is poured into water and treated with an excess of concentrated ammonium hydroxide. After heating the mixture on a steam bath for one hour, concentrating in vacuo and cooling, the precipitate is filtered off, washed with water and ground in a mortar with 15 ml. of 1 N sodium hydroxide. The solid material is filtered off and washed with water to give 6-amino-4-chloro-2-phenylpyrimidine.

Ten grams of 6-amino-4-chloro-2-phenylpyrimidine and 25 ml. of 25% aqueous methylamine are heated in a bomb at 125° C. for four hours. The product, 6-amino-4-methylamino-2-phenylpyrimidine, is isolated by filtration.

A mixture of 11.4 g. of 6-amino-4-methyl-amino-2-phenylpyrimidine and 200 ml. of 10% acetic acid is heated to 90° C. and filtered. The solution is cooled to 3° C. and treated with a solution of 5.0 g. of sodium nitrite in 15 ml. of water added portionwise. After one hour at 0° C. and one hour at room temperature, the mixture is filtered. The solid material obtained is washed with water and dried to give 6-amino-4-methylamino-5-nitroso-2-phenylpyrimidine.

Sodium methoxide (1.2 g.) is added to a refluxing methanol solution of 4.6 g. of 6-amino-4-methylamino-5-nitroso-2-phenylpyrimidine and 1.8 g. of methyl cyanoacetate. The resulting mixture is refluxed for one hour. Working up as described gives methyl 7-amino-4-methyl-amino-2-phenylpteridinecarboxylate. This ester (500 mg.) is heated with 1 g. of methyl hydrazine in 50 ml. of ethoxyethanol for 2 hours. Cooling gives the methyl hydrazide.

Example 12

A mixture of 8.0 g. of 6-amino-4-chloro-2-phenylpyrimidine, prepared as in Example 11, and 30 ml. of 25% aqueous dimethylamine is heated in a bomb at 125° C. for four hours. 6-amino-4-dimethylamino-2-phenyl-pyrimidine is isolated from the mixture by filtration.

Ten grams of 6-amino-4-dimethylamino-2-phenylpyrimidine and 150 ml. of 10% acetic acid are heated at 90° C. and filtered. The mixture is cooled to 0° C. A solution of 4.0 g. of sodium nitrite in 10 ml. of water is added portionwise and the resulting mixture allowed to stand for one hour at 0° C. and one hour at room temperature. The precipitate is filtered off, washed with water and dried to give 6-amino-4-dimethylamino-5-nitroso-2-phenylpyrimidine.

Treatment of the above prepared nitrosopyrimidine (4.8 g.) in refluxing methanol solution with 1.8 g. of methyl cyanoacetate and 1.2 g. of sodium methoxide and working up as described gives methyl 7-amino-4-dimethylamino-2-phenylpteridinecarboxylate which is converted to the hydrazide by reaction with hydrazine in ethoxyethanol as described above.

Example 13

The silver salt of isonitrosomalononitrile (11.1 g.) is added to a solution of 7.8 g. of isonicotinamidine hydrochloride in 100 ml. of methanol and the resulting mixture is stirred for 30 minutes and filtered. The filtrate is evaporated to dryness in vacuo at 30–35° C. The residue is refluxed with 100 ml. of 5-ethyl-2-methylpyridine for ten minutes. Addition of water and ethanol and filtration of the solid gives 4,6-diamino-5-nitroso-2-(4'-pyridyl)-pyrimidine.

Methyl cyanoacetate (2.8 g.) and sodium methoxide (1.78 g.) are added to a boiling solution of 6.45 g. of 4,6-diamino-5-nitroso-2-(4'-pyridyl)-pyrimidine in 400 ml. of methanol. Refluxing the resulting mixture for 30 minutes, filtering off the crystals, extracting with hot water, and recrystallizing from dimethylformamide gives methyl 4,7-diamino-2-(4'-pyridyl)-6-pteridinecarboxylate.

A mixture of 2 g. of methyl 4,7-diamino-2-(4'-pyridyl)-6-pteridinecarboxylate, 3 g. of dimethylhydrazine and 400 ml. of ethoxyethanol is heated at reflux for 5 hours, then cooled to give the desired 4,7-diamino-2-(4'-pyridyl)-6-pteridinecarboxylic acid dimethyl hydrazide.

Example 14

Ten grams of 6-amino-4-chloro-2-phenylpyrimidine, made as in Example 11, and 7.5 g. of dibutylamine in aqueous solution are refluxed for five hours. Filtering the resulting mixture gives 6-amino-4-dibutylamino-2-phenylpyrimidine.

A mixture of 10.0 g. of the above prepared pyrimidine and 150 ml. of acetic acid are heated to 90° C., then filtered and cooled to 0° C. Four grams of sodium nitrite in aqueous solution are added portionwise. The mixture is allowed to stand for one hour at 0° C., and one hour at room temperature and the precipitated 6-amino-4-dibutylamino-5-nitroso-2-phenylpyrimidine is removed by filtration.

To a refluxing solution of 9.8 g. of 6-amino-4-dibutyl-amino-5-nitroso-2-phenylpyrimidine in 500 ml. of ethanol is added 3.3 g. of ethyl cyanoacetate, then 2.2 g. of sodium ethoxide. The resulting mixture is refluxed for one hour. Crystals are collected by filtration, washed with hot water and recrystallized from dimethylformamide to give ethyl 7-amino-4-dibutylamino-2-phenyl-6-pteridinecarboxylate which (500 mg.) is reacted with an excess hydrazine in ethoxyethanol to give the desired acid hydrazide.

Example 15

To a stirred solution of 4.3 g. of m-hydroxybenzamidine hydrochloride in 100 ml. of ethanol is added slowly 5.55 g. of the silver salt of isonitrosomalononitrile. The resulting mixture is stirred for one hour and filtered. The filtrate is evaporated to dryness and the residue is refluxed for ten minutes with 50 ml. of 5-ethyl-2-methylpyridine, then treated with 50 ml. of ethanol. Collection of the solid material by filtration gives 4,6-diamino-2-(m-hydroxyphenyl)-5-nitrosopyrimidine.

Treatment of the above prepared pyrimidine (2.3 g.) in refluxing methanol solution with 0.93 g. of methyl cyanoacetate and 0.59 g. of sodium methoxide and working up as described gives methyl 4,7-diamino-2-(m-hydroxyphenyl)-6-pteridinecarboxylate which (1 g.) is reacted with 1 g. of methylhydrazine in ethoxyethanol to give, upon cooling, the methylhydrazide.

Example 16

A solution of 2.0 g. of 2-phenyl-4,6-diamino-5-nitrosopyrimidine and 0.7 g. of malononitrile in 30 ml. of pyridine is heated at 90–95° C. for four hours. The resulting reaction mixture is then evaporated in a rotating flash evaporator to half volume and diluted with 100 ml. of water. The yellow crystalline solid which separates is collected by filtration, washed with water and recrystallized from aqueous dimethylformamide to give 2-phenyl-4,7-diamino-6-cyanopteridine, M.P. >360° C.

A suspension of 1 g. of 2-phenyl-4,7-diamino-2-cyanopteridine in 100 ml. of anhydrous ethanol with 1 g. of hydrazine is heated at reflux until a clear red solution results. The mixture is cooled and water added to separate a yellow solid, 2-phenyl-4,7-diamino-6-pteridine-amidrazone, M.P. 287° C. (dec.), after recrystallization from aqueous dimethylformamide following initial extraction of the crude product with boiling ethanol.

A suspension of 1 g. of 2-phenyl-4,7-diamino-2-cyanopteridine in 100 ml. of anhydrous ethanol with 1 g. of N-methylhydrazine is heated at reflux. Cooling and the addition of water gives a yellow solid, 2-phenyl-4,7-diamino-6-pteridine-N-methyl-amidrazone, M.P. 310° C. (dec.). The crude product is purified by extration with boiling ethanol and recrystallized from aqueous dimethylformamide. The methyl amidrazone (500 mg.) is reacted with a stoichiometric amount of maleic acid in ethanol on the steam bath to give the maleate salt.

A suspension of 1 g. of 2-phenyl-4,7-diamino-2-cyanopteridine in 150 ml. of anhydrous methanol with 0.75 g. of unsymmetrical dimethylhydrazine is heated at reflux for several hours. Cooling and the addition of water gives 2-phenyl-4,7-diamino-6-pteridine-N-dimethyl-amidrazone.

Example 17

To a stirred solution of 9.55 g. of p-chlorobenzamidine hydrochloride in 200 ml. of methanol is added, slowly, 11.1 g. of the silver salt of isonitrosomalononitrile. The resulting mixture is stirred for one hour and filtered. The filtrate is evaporated to dryness at 30–35° C. To the residue is added 150 ml. of a solution of 5-ethyl-2-methylpyridine and 2-picoline (2:1). The resulting solution is refluxed for 20 minutes. Addition of water and ethanol precipitates a dark green solid which is isolated by filtration and washed with ethanol to give 4,6-diamino-2-(p-chlorophenyl)-5-nitrosopyrimidine.

A mixture of 2.5 g. of the nitroso compound and 0.7 g. of malononitrile in 50 ml. of pyridine is heated at reflux for six hours. After evaporation and quenching, the desired 2-(p-chlorophenyl)-4,7-diamino-6-cyanopteridine is obtained which (500 mg.) is heated in 500 ml. of ethanol with 1 g. of hydrazine to form the amidrazone after evaporation and quenching with water.

Example 18

A solution of 4.65 g. of p-anisamidine hydrochloride in 50 ml. of methanol is treated with 5.55 g. of the silver salt of isonitrosomalononitrile and the resulting mixture is stirred for one hour. The mixture is filtered and the filtrate concentrated to dryness in vacuo at 30–40° C. The residual solid is boiled for five minutes in 30 ml. of 5-ethyl-2-methylpyridine. The solution is cooled, diluted with ethanol and filtered. The dark green solid obtained is 4,6-diamino-2-(p-methoxyphenyl)-5-nitrosopyrimidine, M.P. 278° C. (dec.) which is condensed with malononitrile to form the cyanopteridine and reacted with hydrazine to form the amidrazone as in Example 16.

Example 19

To a solution of 7.94 g. of p-toluamidine hydrochloride in 80 ml. of methanol is added 11.1 g. of the silver salt of isonitrosomalononitrile. The mixture is stirred for 45 minutes, filtered and concentrated to dryness in vacuo at 30–40° C. The residual yellow crystals are boiled with 50 ml. of 5-ethyl-2-methylpyridine for ten minutes. The mixture is cooled and treated with ethanol. The precipitate is filtered off and washed with ethanol and ether to give 4,6-diamino-5-nitroso-2-(p-methylphenyl)-pyrimidine, M.P. 279–280° C. (dec.).

A mixture of 1.2 g. of the pyrimidine and 0.4 g. of malononitrile in 30 ml. of pyridine is heated at 95° C. for three hours. The evaporated reaction mixture is diluted with water to separate 2-(p-methylphenyl)-4,7-diamino-6-cyanopteridine. This compound (500 mg.) in ethanol is heated with isopropylhydrazine (500 mg.) to form the N-isopropylamidrazone upon quenching.

Example 20

A solution of 9.4 g. of o-fluorobenzamidine hydrochloride in 100 ml. of methanol is treated with 11.1 g. of the silver salt of isonitrosomalononitrile. The mixture is stirred for one hour and filtered. The filtrate is concentrated to dryness in vacuo at 30–40° C. The residue is refluxed with 75 ml. of 5-ethyl-2-methylpyridine for ten minutes. The mixture is cooled, diluted with ethanol and filtered. The solid material obtained is washed with ethanol and then with ether to give 4,6-diamino-2-(o-fluorophenyl)-5-nitrosopyrimidine.

A mixture of 1.25 g. of the pyrimidine and 0.4 g. of malononitrile in 30 ml. of pyridine is heated at 90–95° C. for four hours. The volatiles are taken off in vacuo and the residue triturated with water to give 2-(o-fluorophenyl)-4,7-diamino-6-cyanopteridine. This compound (750 mg.) is reacted in methanolic suspension with 1 g. of methylhydrazine. Addition of water gives the N-methylamidrazone.

Example 21

To a solution of 8.5 g. of m-toluamidine hydrochloride in 80 ml. of methanol is added 11.1 g. of the silver salt of isonitrosomalononitrile. The mixture is stirred for one hour, filtered and the filtrate concentrated to dryness in vacuo. The residue is refluxed with a mixture of 100 ml. of 5-ethyl-2-methylpyridine and 50 ml. of 2-picoline and worked up as described to give 4,6-diamino-5-nitroso-2-(m-methylphenyl)-pyrimidine.

A solution of 2.4 g. of the pyrimidine and 0.8 g. of malononitrile in 50 ml. of lutidine is heated at 85–90° C. for six hours. Evaporation under high vacuum and dilution with water gives 2-(m-methylphenyl)-4,7-diamino-6-cyanopteridine. This compound (1 g.) is reacted in ethanol with 750 mg. of dimethylhydrazine at reflux for 3 hours to give, after quenching, the N-dimethylamidrazone.

A solution of 500 mg. of the amidrazone is reacted with one equivalent of hydrochloric acid solution in ethanol. Evaporation in vacuo gives the hydrochloride salt.

Example 22

To a stirred solution of 5.7 g. of o-butoxybenzamidine hydrochloride in 75 ml. of ethanol is added portionwise 5.55 g. of the silver salt of isonitrosomalononitrile. The resulting mixture is stirred for one hour and filtered. The filtrate is evaporated to dryness and the residue is refluxed for ten minutes in 50 ml. of 5-ethyl-2-methylpyridine, cooled and treated with 50 ml. of ethanol. Collection of the solid material by filtration gives 4,6-diamino-2-(o-butoxyphenyl)-5-nitrosopyrimidine.

A mixture of 2.9 g. of the nitrosopyrimidine and 0.7 g. of malononitrile in 75 ml. of pyridine is heated at 65–70° C. for eight hours. The reaction mixture is evaporated and quenched with water to separate 2-(o-butoxyphenyl)-4,7-diamino-6-cyanopteridine. The pteridine (750 g.) is heated at reflux in ethanol with an excess of hydrazine to give the amidrazone by the addition of water.

Example 23

To a solution of 7.0 g. of m-bromobenzamidine hydrobromide in 75 ml. of methanol is added 5.5 g. of the silver salt of isonitrosomalononitrile. The resulting solution is stirred for 30 minutes and filtered. The filtrate is evaporated to dryness in vacuo. The residue is boiled for fifteen minutes in 50 ml. of 5-ethyl-2-methylpyridine, cooled and 50 ml. of ethanol is added. The solid material, 4,6-diamino-2-(m-bromophenyl)-5-nitrosopyrimidine, is isolated by filtration.

A solution of 2.8 g. of the pyrimidine and 0.7 g. of malononitrile in 40 ml. of pyridine is heated at 90° C. for five hours. Evaporation and quenching in water gives 2-(m-bromophenyl)-4,7-diamino-6-cyanopteridine which is in turn heated with an excess of methylhydrazine in ethanol to give the N-methylamidrazone upon quenching.

Example 24

Dry hydrogen chloride is passed into an ethanol solution of p-ethylbenzonitrile (13.1 g.). The resulting solution is allowed to stand for 48 hours. The solid cake is broken up, crushed in a mortar and treated with 3.0 g. of dry ammonia in absolute ethanol. The reaction mixture is shaken for 20 hours, allowed to stand for 48 hours and filtered. The filtrate is allowed to evaporate to dryness and the residue is taken up in water. The aqueous solution is acidified with concentrated hydrochloric acid, decolorized with charcoal, filtered and the filtrate concentrated. Crystals of p-ethylbenzamidine hydrochloride are isolated by filtration.

The silver salt of isonitrosomalononitrile (11.1 g.) is added to a solution of 9.2 g. of p-ethylbenzamidine hydrochloride in 100 ml. of methyl alcohol. Working up the reaction mixture and refluxing with 5-ethyl-2-methylpyridine as described gives 4,6-diamino-2-(p-ethylphenyl)-5-nitrosopyrimidine.

A mixture of 2.5 g. of the pyrimidine and 0.65 g. of malononitrile in 60 ml. of pyridine is heated at reflux for three hours. Evaporation and quenching gives 2-(p-ethylphenyl)-4,7-diamino-6-cyanopteridine which is in turn heated with an excess of hydrazine to give the desired amidrazone.

Example 25

A cooled ethanolic solution of 21.2 g. of m-bromo-p-methoxybenzonitrile is treated with dry hydrogen chloride. The resulting mixture is allowed to stand for 48 hours. The solid cake is crushed in a mortar and then treated with an ethanol solution containing 3.0 g. of dry ammonia. Working up as described gives m-bromo-p-anisamidine hydrochloride.

To a stirred solution of 6.6 g. of m-bromo-p-anisamidine hydrochloride in 50 ml. of methanol is added 5.55 g. of the silver salt of isonitrosomalononitrile. The resulting mixture is stirred for one hour, filtered and concentrated to dryness in vacuo at 30–40° C. The residue is refluxed for ten minutes in 30 ml. of 5-ethyl-2-methylpyridine and 15 ml. of 2-picoline. Dilution with aqueous ethanol and filtration gives 4,6-diamino-2-(m-bromo-p-methoxyphenyl)-5-nitrosopyrimidine.

A solution of 3.1 g. of the pyrimidine and 0.7 g. of malononitrile in 50 ml. of pyridine is heated at 90–95° C. for eight hours. Evaporation and quenching in water gives 2-(m-bromo-p-methoxyphenyl)-4,7-diamino-6-cyanopteridine which (1 g.) is heated at reflux with 1 g. of hydrazine to give the desired amidrazone upon quenching.

Example 26

A solution of 3.6 g. of sodium in 55 ml. of ethanol is added to a mixture of 10.0 g. of hydroxyl amine hydrochloride in 20 ml. of water and 17.2 g. of o-butyl-m-methoxybenzonitrile in 35 ml. of ethanol. The resulting mixture is refluxed for eight hours with stirring, then evaporated to dryness. Aqueous sodium hydroxide solution (10%) is added to the residue, the mixture is filtered and the filtrate acidified with glacial acetic acid. The precipitate, which is o-butyl-m-methoxybenzamidoxime, is isolated by filtration.

The o-butyl-m-methoxybenzamidoxime (11.0 g.) in ethanol solution in the presence of Raney nickel is hydrogenated at 65° C. until the theoretical amount of hydrogen is taken up. The mixture is filtered and evaporated to dryness in vacuo. The residue is dissolved in hot ethanol. The mixture is cooled, treated with dry hydrogen chloride and the o-butyl-m-methoxybenzamidine hydrochloride is isolated by filtration.

The silver salt of isonitrosomalononitrile (5.5 g.) is added to a stirred solution of 6.0 g. of o-butyl-m-methoxybenzamidine hydrochloride in 50 ml. of methanol. The resulting mixture is stirred for one hour, filtered and evaporated to dryness in vacuo. To the residue is added 50 ml. of 5-ethyl-2-methylpyridine and the resulting solution is refluxed for twenty minutes, then diluted with aqueous ethanol and filtered to give 4,6-diamino-2-(o-butyl-m-methoxyphenyl)-5-nitrosopyrimidine.

A mixture of 3 g. of the pyrimidine and 0.8 g. of malononitrile in 75 ml. of pyridine is heated for 10 hours. After evaporation and adding water, the desired 2-(o-butyl-m-methoxyphenyl)-4,7-diamino-6-cyanopteridine separates and is reacted with an excess of hydrazine at reflux in alcohol to give the amidrazone upon evaporation and quenching.

Example 27

To a mixture of 20 g. of 6-amino-2-phenyl-4-pyrimidol and 10 ml. of dimethylaniline is added 100 ml. of phosphorus oxychloride. The resulting mixture is refluxed for eight hours, then concentrated in vacuo. The residue is poured into water and treated with an excess of concentrated ammonium hydroxide. After heating the mixture on a steam bath for one hour, concentrating in vacuo and cooling, the precipitate is filtered off, washed with water and ground in a mortar with 15 ml. of 1 N sodium hydroxide. The solid material is filtered off and washed with water to give 6-amino-4-chloro-2-phenylpyrimidine.

Ten grams of 6-amino-4-chloro-2-phenylpyrimidine and 25 ml. of 25% aqueous methylamine are heated in a bomb at 125° C. for four hours. The product, 6-amino-4-methylamino-2-phenylpyrimidine, is isolated by filtration.

A mixture of 11.4 g. of 6-amino-4-methylamino-2-phenylpyrimidine and 200 ml. of 10% acetic acid is heated to 90° C. and filtered. The solution is cooled to 3° C. and treated with a solution of 5.0 g. of sodium nitrite in 15 ml. of water added portionwise. After one hour at 0° C. and one hour at room temperature, the mixture is filtered. The solid material obtained is washed with water and dried to give 6-amino-4-methylamino-5-nitroso-2-phenylpyrimidine. This compound (2.6 g.) is reacted with 0.8 g. of malononitrile in 100 ml. of pyridine and worked up as described to give 2-phenyl-7-amino-4-methylamino - 6 - cyanopteridine. This compound (500 mg.) in methanol is reacted with 1 g. of hydrazine to give, upon quenching, the desired amidrazone.

*Example 28*

Ten grams of 6-amino-4-chloro-2-phenylpyrimidine, made as in Example 27, and 7.5 g. of dibutylamine in aqueous solution are refluxed for five hours. Filtering the resulting mixture gives 6-amino-4-dibutylamino-2-phenylpyrimidine.

A mixture of 10.0 g. of the above prepared pyrimidine and 150 ml. of acetic acid are heated to 90° C., then filtered and cooled to 0° C. Four grams of sodium nitrite in aqueous solution are added portionwise. The mixture is allowed to stand for one hour at 0° C. and one hour at room temperature and the precipitated 6-amino-4-dibutylamino-5-nitroso-2-phenylpyrimidine is removed by filtration. This compound (2.6 g.) is reacted with 0.6 g. of malononitrile in 50 ml. of pyridine as in Example 27 to give 2-phenyl-7-amino-4-dibutylamino-6-cyanopteridine and also its N-methyl amidrazone by heating 1 g. of the pteridine with 1 g. of methylhydrazine in ethanol.

What is claimed is:

1. A chemical compound selected from the group consisting of a free base and its nontoxic, pharmaceutically acceptable acid addition salts, said free base having the formula:

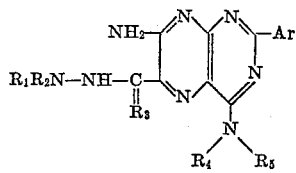

in which $R_1$, $R_2$, $R_4$ and $R_5$ are members selected from the group consisting of hydrogen and lower alkyl; $R_3$ is a member selected from the group consisting of O and NH; and Ar is a member selected from the group consisting of phenyl, chlorophenyl, tolyl, methoxyphenyl, α,α,α-trifluorotolyl, hydroxyphenyl, aminophenyl, thienyl and pyridyl.

2. A chemical compound having the fundamental formula:

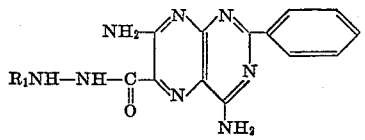

in which $R_1$ is lower alkyl.

3. A chemical compound having the fundamental formula:

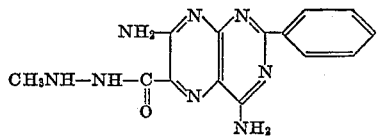

4. A chemical compound having the fundamental formula:

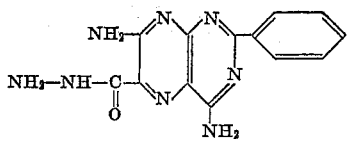

5. A chemical compound having the fundamental formula:

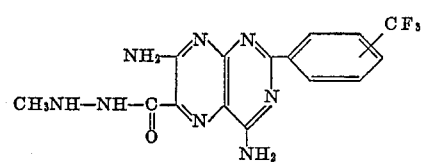

6. A chemical compound having the fundamental formula:

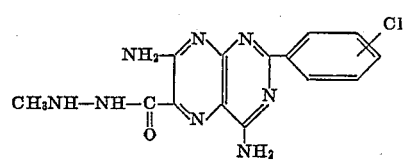

7. A chemical compound having the fundamental formula:

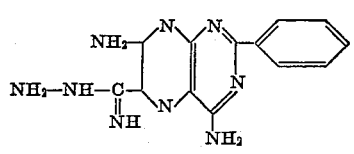

8. A chemical compound having the fundamental formula:

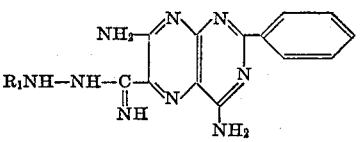

in which $R_1$ is lower alkyl.

9. A chemical compound having the fundamental formula:

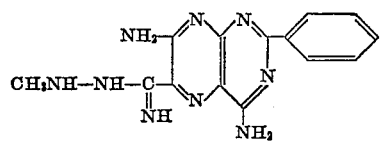

No references cited.